US008332513B2

(12) United States Patent
Wen et al.

(10) Patent No.: US 8,332,513 B2
(45) Date of Patent: Dec. 11, 2012

(54) METHOD AND DEVICE FOR DETECTING CONNECTIVITY TERMINATION OF INTERNET PROTOCOL VERSION 6 ACCESS NETWORKS

(75) Inventors: HaiBo Wen, Shanghai (CN); RenXiang Yan, Shanghai (CN); YingLan Jiang, Shanghai (CN); KeYao Zhu, Shanghai (CN); XuDong Zhu, Shanghai (CN); FanXiang Bin, Shanghai (CN); Wei Jiang, Shanghai (CN)

(73) Assignee: Alcatel Lucent, Paris (FR)

( * ) Notice: Subject to any disclaimer, the term of this patent is extended or adjusted under 35 U.S.C. 154(b) by 727 days.

(21) Appl. No.: 11/222,948

(22) Filed: Sep. 12, 2005

(65) Prior Publication Data

US 2006/0067332 A1 Mar. 30, 2006

(30) Foreign Application Priority Data

Sep. 28, 2004 (CN) .......................... 2004 1 0066761

(51) Int. Cl.
*G06F 15/173* (2006.01)
(52) U.S. Cl. ........ 709/225; 709/203; 709/223; 370/392; 370/393; 370/394; 370/395.1; 370/396; 370/397; 370/398; 370/399; 370/395.2
(58) Field of Classification Search .................. 709/203, 709/223, 225; 370/392–395.2
See application file for complete search history.

(56) References Cited

U.S. PATENT DOCUMENTS

| 7,099,320 B1 * | 8/2006 | Salerno .......................... 370/389 |
| 2002/0031135 A1 * | 3/2002 | Inoue ............................ 370/401 |
| 2003/0007461 A1 * | 1/2003 | Chen et al. .................... 370/254 |
| 2004/0143579 A1 * | 7/2004 | Nakazawa ...................... 707/10 |
| 2004/0184431 A1 * | 9/2004 | Park .............................. 370/346 |

FOREIGN PATENT DOCUMENTS

CN 1411213 4/2003

OTHER PUBLICATIONS

Narten et al: "RFC 2461: Neighbor Discovery for IP Version 6" IETF Request for Comments, Dec. 1998, pp. 1-93 www.ietf.org/rfc/rfc2461.txt.*
European Search Report dated Jan. 25, 2006, issued in Application No. EP 05 01 9169.

\* cited by examiner

*Primary Examiner* — Liangche A Wang
*Assistant Examiner* — Cheikh Ndiaye
(74) *Attorney, Agent, or Firm* — Harness, Dickey & Pierce, P.L.C.

(57) ABSTRACT

The present invention discloses a method and device for detecting connectivity termination in an IPv6 access network based on a DHCP service model. The method for detecting connectivity termination according to the invention comprises the steps of: creating an entry of the subscriber connectivity cache list corresponding to the subscriber terminal in the access node when the IPv6 connectivity between the subscriber terminal and the access node is established successfully; querying the entry of the neighbor cache list corresponding to the subscriber terminal based on the polling time set in the entry of the subscriber connectivity cache list; deciding whether the connectivity of the subscriber terminal is normal based on the entry information corresponding to the subscriber terminal of the subscriber connectivity cache list and neighbor cache list; and performing termination processing on the connectivity of the subscriber terminal logging off abnormally.

13 Claims, 3 Drawing Sheets

| IPv6 address | link-layer address | IsRouter | Pointer_for _packets | Neighbor_State |

| IPv6 addres | Subscriber_State | Polling_Time |

METHOD AND DEVICE FOR DETECTING CONNECTIVITY TERMINATION OF INTERNET PROTOCOL VERSION 6 ACCESS NETWORKS

TECHNICAL FIELD

The present invention relates to Internet Protocol version 6 (IPv6) access networks, in particular to a method and device for detecting connectivity termination in IPv6 access networks.

BACKGROUND ART

With the rapid development of network technology, IPv6 is becoming mature as the next version of Internet Protocol. Since IPv6 can provide more IP addresses and automatic configuration mechanism, various new services (for example, peer-to-peer application) are configured thereon so as to meet a subscriber's different requirements. Thus, accounting various services used by a subscriber becomes a key problem of IPv6.

In order to do the correct accounting, the connectivity time between a subscriber and the network has to be detected correctly. A good connectivity termination detection mechanism should be able to duly detect the abnormal logoffs of the subscriber, for example, the abnormal logoffs due to sudden power off or hardware failure. Then, this mechanism should be able to provide, with respect to such events, basis for service time based accounting, and at the same time, guarantee the safety of using the service by the subscriber, i.e.: the mechanism shall avoid that if subscriber A does an abnormal logoff and this event is not detected, subscriber B may steal the service with subscriber A's IP address.

A conventional Internet Protocol version 4 (IPv4) access network uses a Point-to-Point Protocol (PPP) to monitor a session connectivity via periodic polling, thereby determining whether the connectivity is terminated. However, the following problems arise when a PPP is applied to a PPP-based service mode of IPv6 access networks:

1. Only a 64-bit interface identifier can be negotiated.

As far as an IPv6 terminal (host machine) is concerned, the IPv6 terminal itself can generate a 64-bit interface identifier.

The global IP address of the IPv6 terminal has to be negotiated in other schemes, for example, the auto-configuration scheme of DHCPv6 (Dynamic Host Computer Protocol on IPv6) or stateless auto-configuration scheme. Thus, the complexity of network architecture will be increased if the IPv6 access networks use a PPP-based link detection method.

2. A PPP-based network cannot support multicast data stream.

In a PPP mode, it needs to set up a—layer-2 (or physical layer) PPP link (or PPP tunnel) for each network terminal. When a plurality of terminals in a subscriber network belong to the same multicast group, it needs to duplicate multiple identical multicast data packets in each PPP link (tunnel). Apparently, such a scheme consumes a large amount of bandwidth and fails to make full use of the characteristics of multicast.

In view of the above disadvantages and with the maturity of IPv6, services of access network (e.g. Voice over IP (VoIP) and video-on-demand (VoD)) and various applications are more inclined to use a pure IP approach, i.e. to set up a network connectivity in a non-PPP approach. Since the use of DHCPv6 can realize authentication, service selection and IP address allocation more conveniently, the service mode based on DHCPv6 develops gradually. In this service mode, once the terminal of a DHCPv6 is re-connected to the network, an available IP address (which is used in limited lease time) is automatically allocated from the public IP address pool of a device named as DHCPv6 server and the additional IP configuration information is delivered to the DHCPv6 terminal. Thus, the function of "plug and play" of an IPv6 network can be realized without configuring the DHCPv6 terminal manually.

FIG. 1 schematically illustrates a structural diagram of an IPv6 access network based on DHCP service mode, wherein an access node 101 serves as an IPv6 router to manage the whole access network and control the automatic configuration of services. The DHCPv6 server (not shown) or DHCPv6 proxy (not shown) can be located in the access node 101. The DHCPv6 server uses the state DHCPv6 auto-configuration mechanism to allocate to subscriber terminal 1 . . . n IPv6 addresses and other configuration messages, for example, DNS server address or SIP server address.

With regard to reclaiming resources, usually the DHCPv6 server terminates the connectivity of DHCPv6 to thereby release corresponding resources after receiving the DHCP RELEASE message sent from the terminal. When the connectivity is abnormally terminated, the DHCPv6 server can use a timeout mechanism to process this state. The timeout mechanism controls connectivity states of links in the network by setting lease time for IP addresses. The lease time of IPv6 address in DHCPv6 is usually much longer than that prescribed in the timeout mechanism of the PPPv6 link control protocol and is generally in the order of hour. Apparently, as stated above, such a lease time is hard to satisfy the requirements of safety and accounting. Nevertheless, setting the lease time as one minute is not realistic either, because this will force the DHCPv6 server to allocate IP addresses to the terminal frequently.

According to the specification of RFC 2641, a neighbor cache list is maintained in the access node 101. In this list, there is an entry corresponding to each subscriber terminal, identifying the state whether the subscriber terminal is reachable to the access node 101. All the fields in the entries of the neighbor cache list are shown in FIG. 2A.

In FIG. 2A, according to the specification of RFC 2641, the entries of the neighbor cache list may include a plurality of different fields, wherein an "IPv6 address" field identifies the address of the subscriber terminal to which this entry corresponds. As for each subscriber terminal whose connectivity is not terminated, the neighbor cache list has respectively a corresponding entry. A "Neighbor_State" field identifies whether the subscriber terminal is reachable and may have the following states:

1. Reachable

Within the "ReachableTime" after receiving a positive confirmation indicating that the neighbor is reachable, a "Neighbor_State" field is set as a "REACHABLE" state, showing that the subscriber terminal is reachable within this period of time. In this state, no particular operation is performed when the packet data is transmitted. If the positive confirmation is received once again within the "ReachableTime", the system will reset time. The RFC 2461 defines the "ReachableTime" whose default value is uniformly distributed between 15 seconds to 45 seconds.

2. Stale

If no reachable positive confirmation is received again within the "ReachableTime" after receipt of a positive confirmation indicating the neighbor is reachable, the "Neighbor_State" field enters a "stale" state. When the state is "stale", any operation is not performed until data is transmitted.

3. Delay

If, in the "stale" state, there are data packets to be transmitted, the "Neighbor_State" field enters a "DELAY" state. This state will last at most "DELAY_FIRST_PROBE_TIME", i.e. 5 seconds. During this period of time, it comes into the "PROBE" state if no reachable confirmation is received.

The "delay state" is an optimum state, and the existence thereof makes the upper layer protocol (for example, three-way handshake mechanism of TCP) acquire additional time, thereby expecting the confirmation that the neighbor is reachable.

4. Probe

If the confirmation that the neighbor is reachable is not acquired in the "DELAY" state, the "Neighbor_State" field is set as a "PROBE" state. In this state, a neighbor request is issued every fixed time (default value is 1000 ms) to expect a reachable confirmation.

Using the entries in the aforesaid neighbor cache list, it may detect whether a subscriber terminal is reachable when downlink data is ready to be transmitted in the network. However, in the case that the network has not transmitted downlink data for a long time, it is impossible to learn whether the subscriber terminal is reachable since the access node will not probe the connectivity situation of the subscriber terminal on its own initiative. During this period of time, the subscriber is likely to be logoff abnormally. The aforesaid situation of insecurity will happen if the connectivity of the subscriber terminal is not terminated duly and accurate accounting cannot be executed.

How to strike a balance between the processing requirements and resources consumption has become an urgent problem to be solved in the IPv6 access networks.

SUMMARY OF THE INVENTION

An object of the present invention is to provide a method and device for detecting whether the connectivity between a subscriber terminal and an access node is terminated. The method and device are applied to the DHCP-based service mode in an IPv6 access network. The IPv6 access network comprises an access node and at least one subscriber terminal, a neighbor cache list being stored in the access node. All the entries of the neighbor cache list are used to indicate whether the subscriber terminals connected to the access node are reachable respectively, wherein each entry includes an "IPv6 address" field for identifying the subscriber terminal to which this entry corresponds, and a "Neighbor_State" field to identify whether the subscriber terminal is reachable.

The method for detecting whether a connectivity between a subscriber terminal and an access node is terminated in an IPv6 access network according to the invention comprises the steps of:

creating an entry of the subscriber connectivity cache list corresponding to the subscriber terminal in the access node when the IPv6 connectivity between the subscriber terminal and the access node is established successfully;

querying the entry of the neighbor cache list corresponding to the subscriber terminal based on the polling time set in the entry of the subscriber connectivity cache list;

deciding whether the connectivity of the subscriber terminal is normal based on the entry information corresponding to the subscriber terminal of the subscriber connectivity cache list and neighbor cache list; and performing termination processing on the connectivity of the abnormally logoff subscriber terminal.

The present invention further provides a device for detecting connectivity termination, comprising:

processing means for creating an entry of the subscriber connectivity cache list when the IPv6 connectivity between the subscriber terminal and the access point is established successfully, querying the entry of the neighbor cache list corresponding to the subscriber terminal when the polling time expires, deciding whether the connectivity of the subscriber terminal is normal based on the information stored in the subscriber connectivity cache list and the neighbor cache list, and performing termination processing on the connectivity of the subscriber terminal logging off abnormally;

storing means for storing the subscriber connectivity cache list; and time counting means for time counting based on the time set in the "Polling_Time" field in the entry of the subscriber connectivity cache list.

The method and device for detecting connectivity termination of the invention can be used to detect, in a relatively short time, the state indicating whether the subscriber terminal and the access node of IPv6 access networks are connected normally, without affecting the normal operation of the access node and the subscriber terminal, thereby accounting more accurately the subscriber's use of the services.

BRIEF DESCRIPTION OF DRAWINGS

The characteristics and advantages of the present invention will become more apparent through the following illustration of the preferred embodiments with reference to the drawings, wherein.

EMBODIMENTS

The principle of the invention will be explained in more detail through the following preferred embodiments.

In order to duly determine whether the subscriber terminal is reachable, the present invention creates, in an access node, a data structure, i.e. a subscriber connectivity cache list. The entries of this list represent the connectivity state of each subscriber terminal and the next polling time respectively, all the fields therein being shown in FIG. 2B.

Figures 1, 2A, 2B:
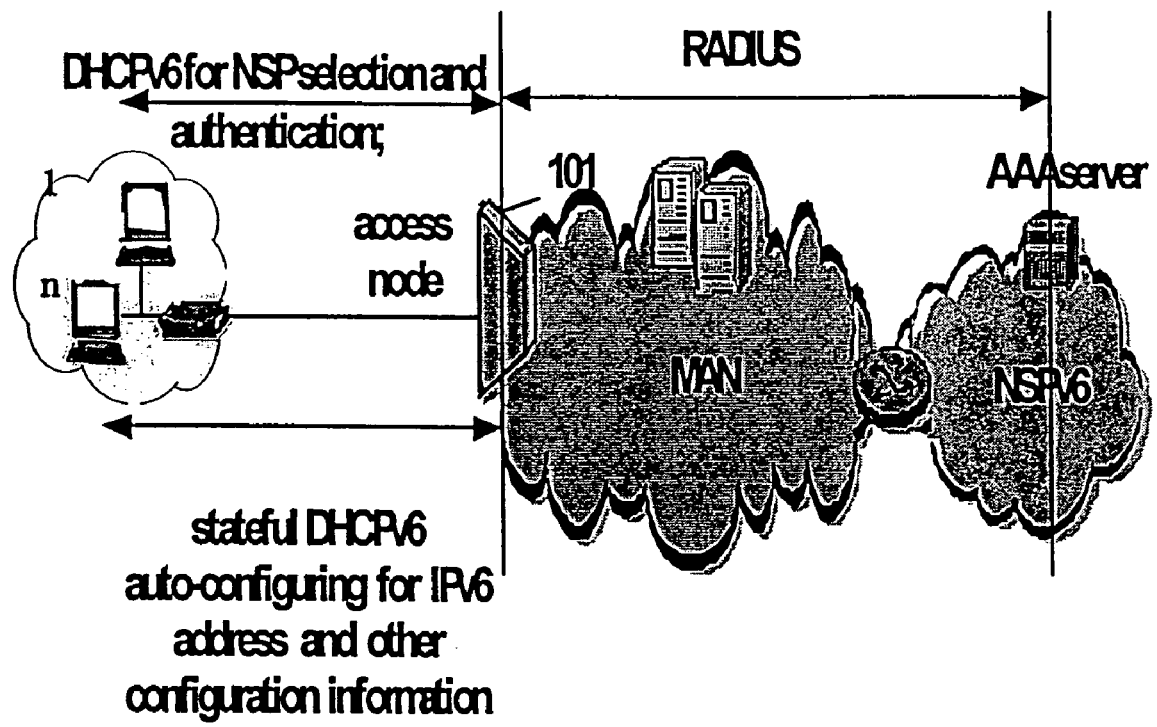
FIG. 1 schematically illustrates a structural diagram of an IPv6 access network based on DHCPv6 service mode.
FIG. 2A illustrates all the fields in the entries of a neighbor cache list.
FIG. 2B illustrates all the fields in the entries of a subscriber connectivity cache list according to the invention.

As shown in FIG. 2B, the entries of the subscriber connectivity cache list include the following fields:

1. "IPv6 address" Field identifying the address of the subscriber terminal to which this entry corresponds. For each subscriber terminal that is connected normally, there is a corresponding entry in the subscriber connectivity cache list.

2. "Subscriber_State" Field identifying the state of the subscriber terminal. It may has the following states:

(1) ACTIVE identifying the connectivity of the subscriber terminal is normal, that is, the subscriber is using the service(s) provided by the access node.

(2) DELAY identifying it is waiting for other standard mechanisms (for example, the detection mechanism of Neighbor Discovery Processing) of IPv6 to monitor the detection results about whether the subscriber terminal is reachable;

(3) PROBE directly and voluntarily triggering the Neighbor Unreachability Detection mechanism to determine whether the neighbor (subscriber terminal) is in an active state.

3. "Polling_Time" Field identifying the next polling time for the subscriber.

Through the subscriber connectivity cache list created in the access node, the access node can detect duly whether the subscriber terminal is reachable by querying the neighbor cache list and the subscriber connectivity cache list, terminate the connectivity when detecting that the subscriber terminal logs off abnormally and stop accounting.

The method for detecting connectivity termination according to the invention is hereby explained in detail with reference to FIG. 3.

Figure 3:
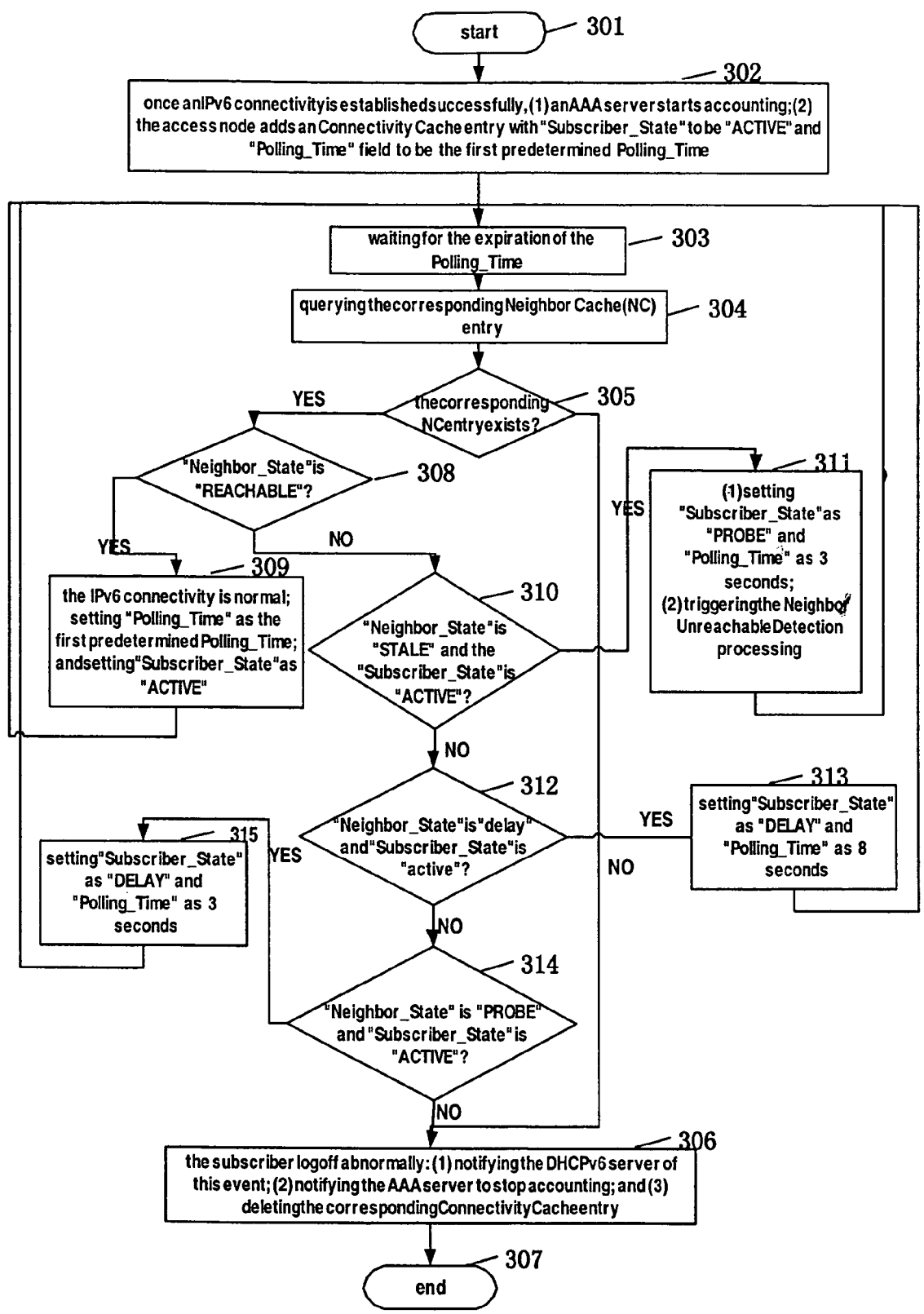
FIG. 3 is a flow chart of a method for detecting connectivity termination according to the invention.

As shown in FIG. 3, the method for detecting connectivity termination of a subscriber terminal according to the invention starts from step 301. In step 302, once the IPv6 connectivity between the subscriber terminal and the access node is established successfully, an Authentication Authorization Accounting (AAA) server begins to charge the user. In the meanwhile, an entry of the subscriber connectivity cache list corresponding to the subscriber is created in the access node, setting the "Subscriber_State" field in the entry as "ACTIVE", and the "Polling_Time" field as the first predetermined polling time.

After that, the procedure enters step 303. Waiting is executed in step 303. When the polling time expires, the procedure enters step 304. In step 304, the entry of the neighbor cache list to which the subscriber corresponds is queried. Then, in step 305, it is decided whether there exists a corresponding entry of the neighbor cache list. When it is decided in step 305 that there is no corresponding entry of the neighbor cache list, the procedure enters step 306. In step 306, it is determined the subscriber terminal logs off abnormally to thereby notify the DHCPv6 server of this situation, inform the AAA server of stopping accounting and at the same time, delete the entries of the subscriber connectivity cache list to which the subscriber corresponds. The procedure shown by FIG. 3 ends at step 307.

When it is decided in step 305 that there exists a corresponding entry of the neighbor cache list, the procedure enters step 308. In step 308, it is decided whether the "Neighbor_State" field in the entry of the neighbor cache list is "REACHABLE". If so, the procedure enters step 309. In step 309, it is determined that the subscriber is in a normal connectivity state at this time. The "Subscriber_State" field in the entry of the subscriber connectivity cache list is set as "ACTIVE", and the "Polling_Time" field as the first predetermined polling time. Preferably, the first predetermined polling time is 53 seconds. After that, the procedure returns to step 303 to start the next round of waiting. At this time, the polling time to be waited for is the first predetermined polling time.

When it is decided in step 308 that the "Neighbor_State" field in the entry of the neighbor cache list is not "REACHABLE", the procedure enters step 310. In step 310, it is decided whether the "Neighbor_State" field in the entry of the neighbor cache list is "stale", and whether the "Subscriber_State" field in the entry of the subscriber connectivity cache list is "ACTIVE". When it is decided that the "Neighbor_State" field is "stale" and the "Subscriber_State" field is "ACTIVE", the procedure enters step 311. Otherwise, the procedure enters step 312. In step 311, the "Subscriber_State" field in the entry of the subscriber connectivity cache list is set as "PROBE", the "Polling_Time" field is set as the second predetermined polling time, and the Neighbor Unreachable Detection processing is triggered voluntarily. Setting the "Subscriber_State" field in the entry of the subscriber connectivity cache list as "PROBE" means that the access node will start the Neighbor Unreachable Detection processing on its own initiative so as to probe whether the subscriber is reachable.

The second predetermined polling time is determined according to the default time when the "Neighbor_State" field in the entry of the neighbor cache list is "PROBE". The default time is 3 seconds. It may set the second predetermined polling time as being equal to or greater than the default time at the aforesaid "PROBE" state, for example, 5 seconds. Thus, it ensures that the confirmation as to whether the "Neighbor_State" is reachable can be received when the second predetermined polling time expires. However, in order to achieve the object of the invention, i.e. detecting whether the subscriber terminal is connected normally as soon as possible, it is preferable to set the second predetermined polling time as being equal to the default time 3 seconds when the "Neighbor_State" field is "PROBE". After that, the procedure returns to step 303 to start the next round of waiting. At this time, the polling time to be waited for is the second predetermined polling time.

When it is decided in step 312 that the "Neighbor_State" field in the entry of the neighbor cache list is "DELAY" and the "Subscriber_State" field in the entry of the subscriber connectivity cache list is "ACTIVE", the procedure enters step 313. Otherwise, the procedure enters step 314. In step 313, the "Subscriber_State" field in the entry of the subscriber connectivity cache list is set as "delay", and the "Polling_Time" field is set as the third predetermined polling time. Setting the "Subscriber_State" field in the entry of the subscriber connectivity cache list as "DELAY" means that the access node will wait for the detection result as to whether the subscriber terminal is reachable detected by other existing mechanisms (for example, when the access node has data to be transmitted to the corresponding terminal in the "stale" state, the access node will enter the "DELAY" state to trigger a corresponding mechanism to monitor whether the neighbor is reachable), thereby finally determining whether the subscriber is reachable.

The third predetermined polling time is determined according to the sum of the default time when the "Neighbor_State" field in the entry of the neighbor cache list is "DELAY" and "PROBE". The sum of the default time is 8 seconds. It may set the third predetermined polling time as being equal to or greater than the above sum of the default time in "DELAY" and "PROBE" states, for example, 10 seconds. Thus, it is ensured that the confirmation as to whether the "Neighbor_State" is reachable can be received when the third predetermined polling time expires. However, in order to achieve the object of the invention, i.e. detecting whether the subscriber terminal is connected normally as soon as possible, it is preferable to set the third predetermined polling time as being equal to the sum of default time, 8 seconds, when the "Neighbor_State" field is "DELAY" and "PROBE". After that, the procedure returns to step 303 to start the next round of waiting. At this time, the polling time to be waited for is the third predetermined polling time.

When it is decided in step 314 that the "Neighbor_State" field in the entry of the neighbor cache list is "PROBE" and the "Subscriber_State" field in the entry of the subscriber connectivity cache list is "ACTIVE", the procedure enters step 315. Otherwise the procedure enters step 306. In step 315, the "Subscriber_State" field in the entry of the subscriber connectivity cache list is set as "delay", and the "Polling_Time" field is set as the fourth predetermined polling time. Setting the "Subscriber_State" field in the entry of the subscriber connectivity cache list as "DELAY" means that the access node will wait for the detection result as to whether the subscriber terminal is reachable detected by other mechanisms, thereby finally determining whether the subscriber is reachable.

The fourth predetermined polling time is determined according to the default time when the "Neighbor_State" field in the entry of the neighbor cache list is "PROBE". The default time is 3 seconds. It may set the fourth predetermined polling time as being equal to or greater than the default time at the aforesaid "PROBE" state, for example, 5 seconds. Thus, it is ensured that the confirmation as to whether the "Neighbor_State" is reachable can be received when the fourth predetermined polling time expires. However, in order to accomplish the object of the invention, i.e. detecting whether the subscriber terminal is connected normally as soon as possible, it is preferable to set the fourth predetermined polling time as being equal to the default time 3 seconds when the "Neighbor_State" field is "PROBE". After that, the procedure returns to step 303 to start the next round of waiting. At this time, the polling time to be waited for is the fourth predetermined polling time.

In step 306, since it is decided that the "Neighbor_State" field in the neighbor cache is none of "REACHABLE", "stale", "DELAY" or "PROBE" states after the previous decisions, it may be determined that the subscriber terminal logs off abnormally to thereby notify the DHCPv6 server of this situation, inform the AAA server of stopping accounting and at the same time, delete the entry of the subscriber connectivity cache list to which the subscriber corresponds. The procedure shown by FIG. 3 ends at step 307.

In the method for detecting connectivity termination according to the invention, the first predetermined polling time could be set according to the actual requirements of subscribers. However, in order to strike an optimum balance between the processing complexity of the access node and timeliness of termination detection, it may select the first predetermined polling time from the default time of several states in the "Neighbor_State" field in the entry of neighbor cache list. Preferably, the first predetermined polling time is set as being equal to or greater than the sum of the following three: the longest default time 45 second when the "Neighbor_State" field in the neighbor cache list is "reachable'; the default time 5 seconds when the "Neighbor_State" field is "delay"; and the default time 3 seconds when the "Neighbor_State" field is "PROBE". Thus, the sum of the three is 53 seconds. Then, the first predetermined polling time is set as being equal to or greater than 53 seconds, for example 60 seconds.

The first predetermined polling time indicates that it may be detected whether the connectivity between the subscriber terminal and the access node is normal within the time length according to the method for detecting connectivity termination of the invention. It is much shorter than the connectivity termination time controlled in the order of hour in the prior art. Therefore, this method of the invention is able to detect more accurately whether the subscriber terminal logs off abnormally to thereby avoid the problem of security and inaccurate accounting, which may occur.

Figure 4:
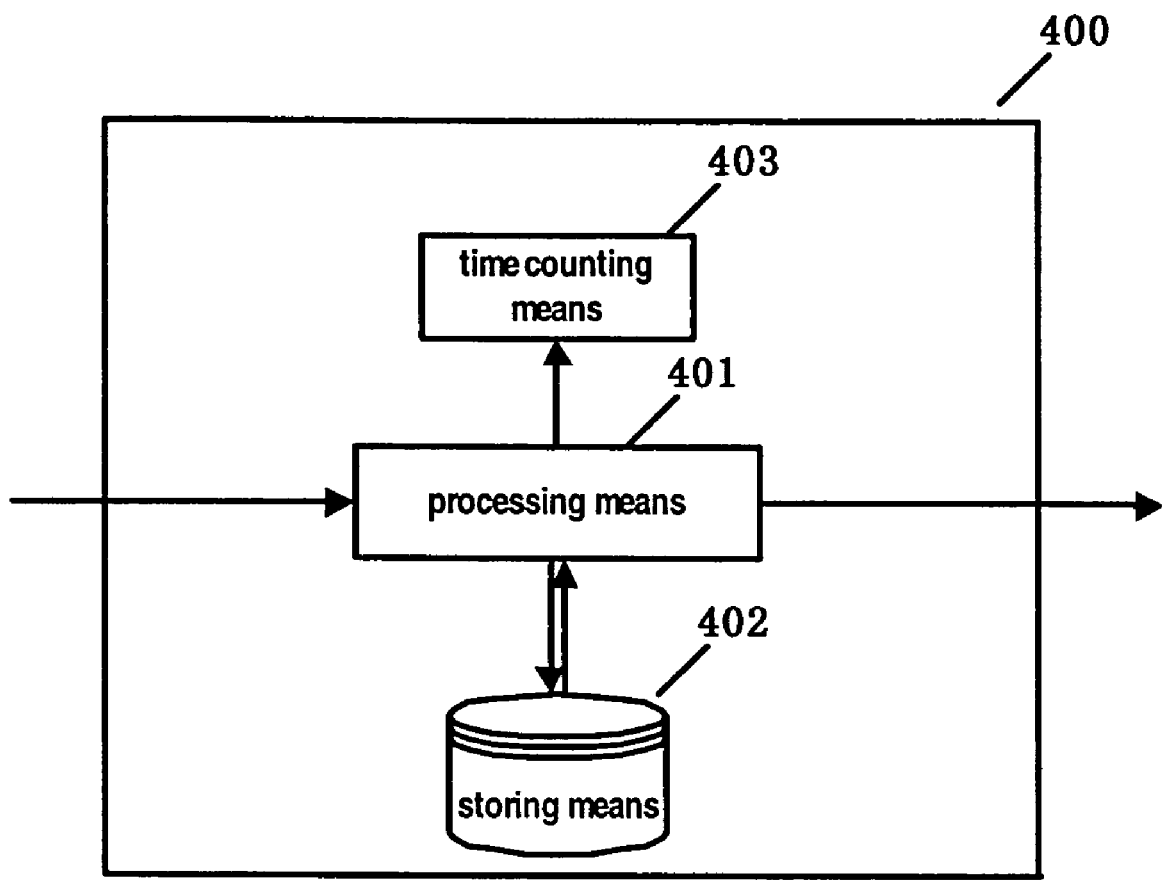
FIG. 4 schematically illustrates a structural diagram of a device for detecting connectivity termination according to the invention.

The present invention further provides a device 400 for detecting connectivity termination in an IPv6 access network, as shown in FIG. 4. The device comprises a processing means 401, a storing means 402 and a time counting means 403. The device 400 for detecting connectivity termination according to the invention can be installed within or outside an access node.

After a connectivity between a subscriber terminal and an access node is established successfully, the processing means 401 creates an entry of the subscriber connectivity cache list that corresponds to the subscriber terminal, and stores the entry of the subscriber connectivity cache list in the subscriber connectivity cache list of the storing means 402. The entry of the subscriber connectivity cache list represents the connectivity status of the corresponding subscriber terminal and the access node. The processing means 401 sets the "Subscriber_State" field in the entry of the subscriber connectivity cache list as "ACTIVE" and the "Polling_Time" field as the first predetermined polling time, for example, 60 seconds. At the same time, the processing means 401 issues an instruction of starting accounting to the AAA server and issues an instruction of starting time counting to the time counting means 403. The time counting means 403 starts time counting according to the first predetermined polling time as set.

When the first predetermined polling time expires, the time counting means 403 notifies the processing means 401 of querying the entries of the neighbor cache list and the entries of the subscriber connectivity cache list stored in the storing means 402, and performs different processing according to their different states. It should be noted that the aforesaid neighbor cache list could be stored either in the storing means 402 of the device 400 for detecting connectivity termination according to the invention or in the access node directly.

Below, different processing performed by the processing means 401 is explained in detail.

When the processing means 401 queries that the neighbor cache list has no entry corresponding to the subscriber terminal, it makes a decision that the subscriber terminal has already logged off abnormally. Then, the processing means 401 issues an instruction of stopping accounting to the AAA server and deleting the entry corresponding to the subscriber terminal from the subscriber connectivity cache list of the storing means 402.

When the processing means 401 queries that the neighbor cache list contains the entry corresponding to the subscriber terminal, the "Neighbor_State" field in the entry of the neighbor cache list is "REACHABLE", and the "Subscriber_State" field in the entry of the subscriber connectivity cache list is set as "ACTIVE", it is determined that the subscriber terminal is in normal connectivity. Thus, the "Subscriber_State" field is set as "ACTIVE" and the "Polling_Time" field is reset as the first predetermined polling time. The processing means 401 issues an instruction of starting timing to the time counting means 403. The time counting means 403 restarts timing according to the first predetermined polling time as set and notifies the processing means 401 of starting the query of next turn when the timing expires.

When the processing means 401 queries that the neighbor cache list contains the entry corresponding to the subscriber terminal, the "Neighbor_State" field in the entry of the neighbor cache list is "stale", and the "Subscriber_State" field in the entry of the subscriber connectivity cache list is "ACTIVE", the "Subscriber_State" field in the entry of the subscriber connectivity cache list is set as "PROBE" and the "Polling_Time" field as the second predetermined polling time, preferably 3 seconds. At the same time, the processing means 401 triggers the Neighbor Unreachable Detection processing. The time counting means 403 is activated to start timing. The time counting means 403 restarts timing according to the second predetermined polling time as set and notifies the processing means 401 of starting the query of next turn when the counted time expires.

When the processing means 401 queries that the neighbor cache list contains the entry corresponding to the subscriber terminal, the "Neighbor_State" field in the entry of the neighbor cache list is "delay", and the "Subscriber_State" field in the entry of the subscriber connectivity cache list is "ACTIVE", the "Subscriber_State" field in the entry of the subscriber connectivity cache list is set as "DELAY" and the "Polling_Time" field as the third predetermined polling time, preferably 8 seconds. The time counting means 403 is activated to start timing. The time counting means 403 restarts timing according to the third predetermined polling time as set and notifies the processing means 401 of starting the inquiry of next turn when the timing expires.

When the processing means 401 queries that the neighbor cache list contains the entry corresponding to the subscriber terminal, the "Neighbor_State" field in the entry of the neighbor cache list is "PROBE", and the "Subscriber_State" field in the entry of the subscriber connectivity cache list is "ACTIVE", the "Subscriber_State" field in the entry of the subscriber connectivity cache list is set as "DELAY" and the "Polling_Time" field as the fourth predetermined polling time, preferably 3 seconds. The time counting means 403 is activated to start timing. The time counting means 403 restarts timing according to the fourth predetermined polling time as set and notifies the processing means 401 of starting the inquiry of next turn when the timing expires.

Through the previous explanation it can be seen that the method and device for detecting connectivity termination in an IPv6 access network according to the invention use the "Neighbor_State" field in an entry of the standard neighbor cache list to create a subscriber connectivity cache list representing the connectivity state between the subscriber terminal and the access node for setting polling time, thereby ensuring that the connectivity state of the subscriber terminal is detected once within a relatively short time, for example, one minute. When the subscriber terminal has been detected logging off abnormally, the connectivity is terminated and the accounting is stopped to thereby guarantee the security and reliability of the subscriber account. Such a method and device can be easily applied to a conventional access node and will not have any impact on the access node of IPv6.

It should be noted that the method and device for detecting connectivity termination in an IPv6 access networks according to the invention can be applied not only to a DHCPv6-based network model, actually, such a method and device that perform corresponding processing according to the state of an entry in the neighbor cache list and trigger corresponding mechanism can also be applied to a non-DHCP network model through creating a corresponding entry of the subscriber connectivity cache entry at appropriate time.

Various variation and modifications of the invention can be made without departing from the scope and concept of the invention. The present invention is not limited to the above specific embodiments. The scope of the invention is defined by the appended claims.

The invention claimed is:

1. A method for detecting whether a connectivity between a subscriber terminal and an access node is terminated in an IPv6 access network, said IPv6 access network having said access node and at least one said subscriber terminal, said access node storing a neighbor cache list, the method comprising:

creating an entry of a subscriber connectivity cache list corresponding to a subscriber terminal in an access node when connectivity between the subscriber terminal and the access node is established successfully;

querying an entry of a neighbor cache list corresponding to the subscriber terminal based on a polling time set in the entry of the subscriber connectivity cache list, the polling time being based on entry information in the subscriber connectivity cache list and entry information in the neighbor cache list, the subscriber connectivity cache list including a subscriber state that identifies the state of the subscriber terminal, the neighbor cache list including a neighbor state that identifies whether the subscriber terminal is reachable;

deciding whether the connectivity is desired based on the entry information corresponding to the subscriber terminal of the subscriber connectivity cache list and neighbor cache list, the entry information of the neighbor cache list identifying at least if the subscriber terminal is reachable;

performing termination processing on the connectivity of the subscriber terminal based on the neighbor cache list and the subscriber connectivity cache list when logging off abnormally; and deleting the created entry of the subscriber connectivity cache list when logging off abnormally.

2. The method for detecting whether a connectivity is terminated according to claim 1, wherein the entry of the subscriber connectivity cache list further comprises:

an "IPv6 address" field for identifying an address of the subscriber terminal;

a "Subscriber_State" field for identifying a connectivity state of the subscriber terminal; and a "Polling_Time" field for setting the polling time.

3. The method for detecting whether a connectivity is terminated according to claim 2, wherein the creating an entry of the subscriber connectivity cache list step (i) sets the "Subscriber_State" field as "ACTIVE", representing that said subscriber terminal is connected, and (ii) sets the "Polling_Time" field as a first polling time.

4. The method for detecting whether a connectivity is terminated according to claim 3, wherein said first polling time is equal to or greater than a sum of at lease one of:

a first default time when a "Neighbor_State" field of the neighbor cache list is "reachable";

a second default time when the "Neighbor_State" field is "delay"; and a third default time when the "Neighbor_State" field is "PROBE".

5. The method for detecting whether a connectivity is terminated according to claim 1, wherein the querying step further comprises:

awaiting a corresponding polling time according to the time set in the "Polling_Time" field in said entry of said subscriber connectivity cache list, and inquiring whether the neighbor cache list contains an entry corresponding to the subscriber terminal when the polling time expires.

6. The method for detecting whether a connectivity is terminated according to claim 5, wherein the deciding step comprises:

deciding that the subscriber terminal logs off abnormally when the neighbor cache list does not contain an entry corresponding to the subscriber terminal after query; and deciding, when the neighbor cache list contains the entry corresponding to the subscriber terminal after query, whether the connectivity is normal based on the state of the "Neighbor_State" field therein and a state of the "Subscriber_State" field in the entry of the subscriber connectivity cache list.

7. The method for detecting whether a connectivity is terminated according to claim 6, wherein the processing step comprises:
   terminating, the connectivity between the subscriber terminal and the access node when the subscriber terminal logs off abnormally, and
   deleting the entry corresponding to the subscriber terminal from the subscriber connectivity cache list.

8. A device for detecting whether a connectivity between a subscriber terminal and an access node is terminated in an IPv6 access network, said IPv6 access network having said access node and at least one said subscriber terminal, said access node storing a neighbor cache list, and an entry of said neighbor cache list including an "IPv6 address" field and a "Neighbor_State" field, the device comprising:
   a processor configured to,
      create an entry of a subscriber connectivity cache list when a connectivity between a subscriber terminal and a access point is established successfully,
      query an entry of a neighbor cache list corresponding to the subscriber terminal when a polling time expires, the polling time being based on entry information in the subscriber connectivity cache list and entry information in the neighbor cache list, the subscriber connectivity cache list including a subscriber state that identifies the state of the subscriber terminal, the neighbor cache list including a neighbor state that identifies whether the subscriber terminal is reachable,
      decide whether the connectivity is desired based on information stored in the subscriber connectivity cache list and the neighbor cache list, the entry information of the neighbor cache list identifying at least if the subscriber terminal is reachable, and
      perform termination processing on the connectivity of the subscriber terminal based on the neighbor cache list and the subscriber connectivity cache list when logging off abnormally;
   a memory configured to store the subscriber connectivity cache list;
   a time counter configured to count based on a time set in a "Polling_Time" field in the entry of the subscriber connectivity cache list; and
   a deleter configured to delete the created entry of the subscriber connectivity cache list when logging off abnormally.

9. The device for detecting connectivity termination according to claim 8, wherein the entry of said subscriber connectivity cache list comprises:
   an "IPv6 address" field for identifying an address of a subscriber terminal corresponding to this entry;
   a "Subscriber_State" field for identifying a connectivity state of the subscriber terminal; and
   a "Polling_Time" field for setting the polling time.

10. The device for detecting connectivity termination according to claim 9, wherein the possessor is configured to set the "Subscriber_State" field as "ACTIVE", representing that the subscriber terminal is connected, and set the "Polling_Time" field as a first polling time when it creates an entry of a subscriber connectivity cache list.

11. The device for detecting connectivity termination according to claim 10, wherein said first polling time is equal to or greater than a sum of at least one of:
   a first default time when a "Neighbor_State" field of the neighbor cache list is "reachable; a second default time when the "Neighbor_State" field is "delay"; and a third default time when the "Neighbor_State" field is "PROBE".

12. The device for detecting connectivity termination according to claim 11, wherein the processor is configured to decide that the subscriber terminal logs off abnormally when the neighbor cache list does not contain an entry corresponding to said subscriber terminal after a query, thereby terminating the connectivity of the subscriber terminal and deleting the entry corresponding to the subscriber terminal from the subscriber connectivity cache list from the storing means; the possessor is configured to decide when the neighbor cache list contains the entry corresponding to said subscriber terminal after query, whether the connectivity of subscriber terminal is normal based on the state of the "Neighbor_State" field therein and the state on the "Subscriber_State" field in the entry of the subscriber connectivity cache list.

13. A method for detecting connectivity in a network, the method comprising:
   creating a subscriber connectivity cache list when connectivity between a subscriber terminal and an access node is established;
   querying for an entry in a neighbor cache list corresponding to the subscriber terminal based on a polling time set in the subscriber connectivity cache list, the polling time being based on entry information in the subscriber connectivity cache list and entry information in the neighbor cache list, the subscriber connectivity cache list including a subscriber state that identifies the state of the subscriber terminal, the neighbor cache list including a neighbor state that identifies whether the subscriber terminal is reachable;
   deciding whether the connectivity is desired based on the entry information corresponding to the subscriber terminal of the subscriber connectivity cache list and neighbor cache list;
   terminating connectivity when subscriber terminal entry information in the neighbor cache list and the subscriber connectivity cache list is undesired, the entry information of the neighbor cache list identifying at least if the subscriber terminal is reachable; and
   deleting the created entry of the subscriber connectivity cache list when logging off abnormally.

* * * * *